United States Patent
Portugal

(10) Patent No.: US 9,398,124 B2
(45) Date of Patent: Jul. 19, 2016

(54) CELLULAR PHONE CHARGING CASE ASSEMBLY

(71) Applicant: Octavio S. Portugal, Dixon, CA (US)

(72) Inventor: Octavio S. Portugal, Dixon, CA (US)

( * ) Notice: Subject to any disclaimer, the term of this patent is extended or adjusted under 35 U.S.C. 154(b) by 0 days.

(21) Appl. No.: 14/560,133

(22) Filed: Dec. 4, 2014

(65) Prior Publication Data

US 2016/0165022 A1    Jun. 9, 2016

(51) Int. Cl.
*H04M 1/00* (2006.01)
*H04M 1/02* (2006.01)

(52) U.S. Cl.
CPC .... *H04M 1/0262* (2013.01); *H04M 2001/0204* (2013.01)

(58) Field of Classification Search
CPC .. H04B 1/3888; H04B 5/0037; H04B 1/3816; H04B 1/3883; H04M 1/0262; H04M 1/04; H02J 7/35; H02J 7/0042; H02J 7/0027
USPC ..................... 455/571, 572, 573, 575.1, 90.3
See application file for complete search history.

(56) References Cited

U.S. PATENT DOCUMENTS

| | | | |
|---|---|---|---|
| D382,535 S | 8/1997 | Chiang | |
| 5,898,932 A | 4/1999 | Zurlo et al. | |
| 6,084,379 A | 7/2000 | Buniatyan | |
| 6,339,311 B1 | 1/2002 | Caldwell | |
| 6,376,764 B1 | 4/2002 | Luo | |
| 6,847,834 B1 | 1/2005 | Leem | |
| 7,888,908 B2 | 2/2011 | Kuo | |
| 2003/0096642 A1* | 5/2003 | Bessa | H04M 1/04 455/573 |
| 2005/0162121 A1 | 7/2005 | Chan | |
| 2013/0040707 A1* | 2/2013 | Metcalf | H01M 10/465 455/566 |
| 2013/0157729 A1* | 6/2013 | Tabe | H04W 52/0245 455/573 |
| 2014/0340573 A1* | 11/2014 | Clawson | H04N 5/2252 348/371 |
| 2015/0133204 A1* | 5/2015 | Ivanovski | H04B 1/3816 455/575.8 |
| 2015/0207360 A1* | 7/2015 | Adams | H02J 7/35 320/101 |

FOREIGN PATENT DOCUMENTS

| GB | 2386027 A | * | 9/2003 | H02J 7/355 |
|---|---|---|---|---|
| GB | 2653053 A1 | * | 10/2013 | A45C 11/00 |

* cited by examiner

*Primary Examiner* — Olumide T Ajibade Akonai

(57) ABSTRACT

A cellular phone charging case assembly includes a housing with a back wall and a perimeter wall. The perimeter wall extends away from the back wall and has a distal edge with respect to the back wall. A lip is attached to and is coextensive with the distal edge. The lip extends inwardly and is positioned over the back wall. The lip releasably retains a cellular phone within the housing between the lip and the back wall. A male plug is mounted within the housing and engages the cellular phone when the cellular phone is positioned within the housing. A plurality of photovoltaic cells is mounted on an outer surface of the back wall. The plurality of photovoltaic cells is in electrical communication with the male plug to supply electricity to the male plug when the plurality of photovoltaic cells generate electricity.

3 Claims, 3 Drawing Sheets

CELLULAR PHONE CHARGING CASE ASSEMBLY

BACKGROUND OF THE DISCLOSURE

Field of the Disclosure

The disclosure relates to cellular phone charging devices and more particularly pertains to a new cellular phone charging device for charging a cellular phone with electricity generated by photovoltaic cells.

SUMMARY OF THE DISCLOSURE

An embodiment of the disclosure meets the needs presented above by generally comprising a housing having a back wall and a perimeter wall is coextensive with and attached to a perimeter edge of the back wall. The perimeter wall extends away from the back wall and has a distal edge with respect to the back wall. A lip is attached to and is coextensive with the distal edge. The lip extends inwardly and is positioned over the back wall. An area bounded by the lip defines an opening configured to receive a cellular phone. The lip releasably retains the cellular phone within the housing between the lip and the back wall. A male plug is mounted within the housing and engages the cellular phone when the cellular phone is positioned within the housing. A plurality of photovoltaic cells is mounted on an outer surface of the back wall. The plurality of photovoltaic cells is in electrical communication with the male plug to supply electricity to the male plug when the plurality of photovoltaic cells generate electricity.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
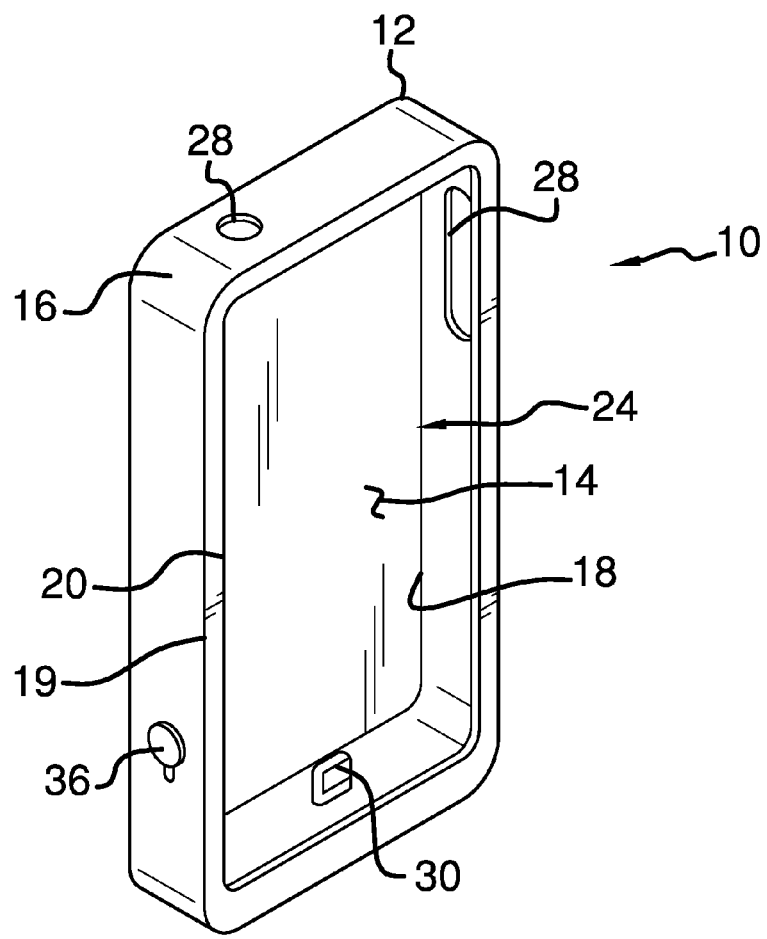
FIG. 1 is a front perspective view of a cellular phone charging case assembly according to an embodiment of the disclosure.
Figure 2:
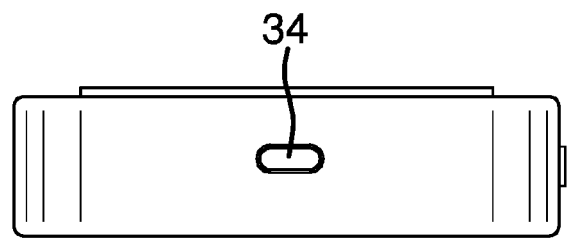
FIG. 2 is a bottom view of an embodiment of the disclosure.
Figure 3:
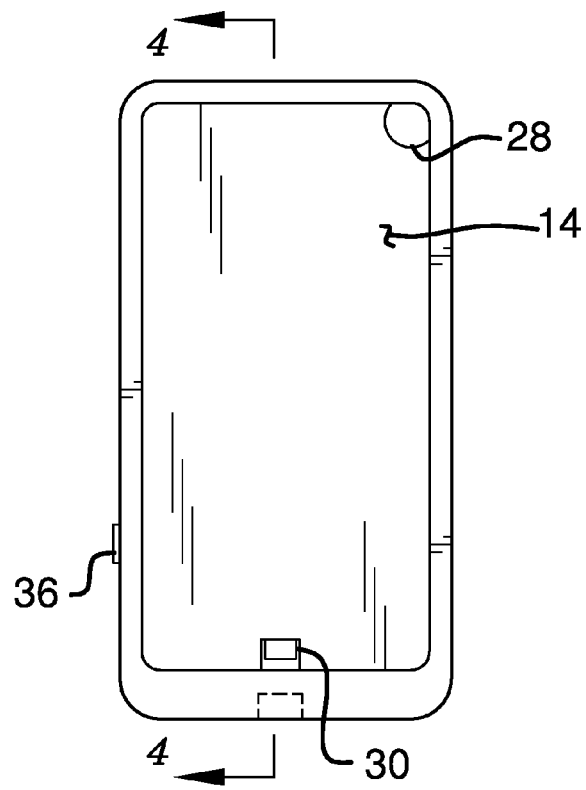
FIG. 3 is a front view of an embodiment of the disclosure.
Figure 4:
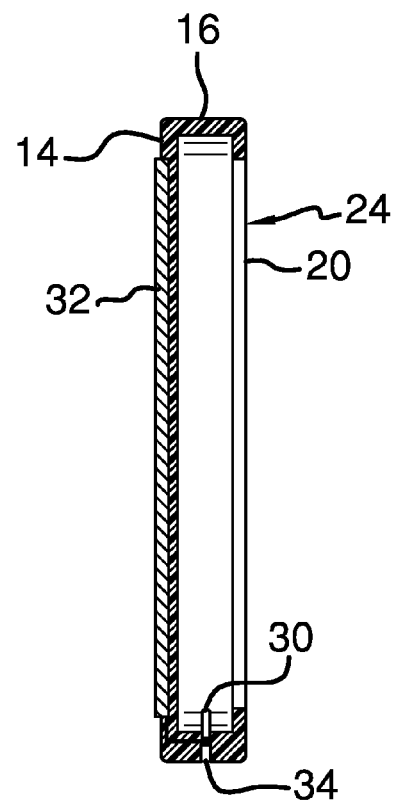
FIG. 4 is a cross-sectional view of an embodiment of the disclosure taken along line 4-4 of FIG. 3.
Figure 5:
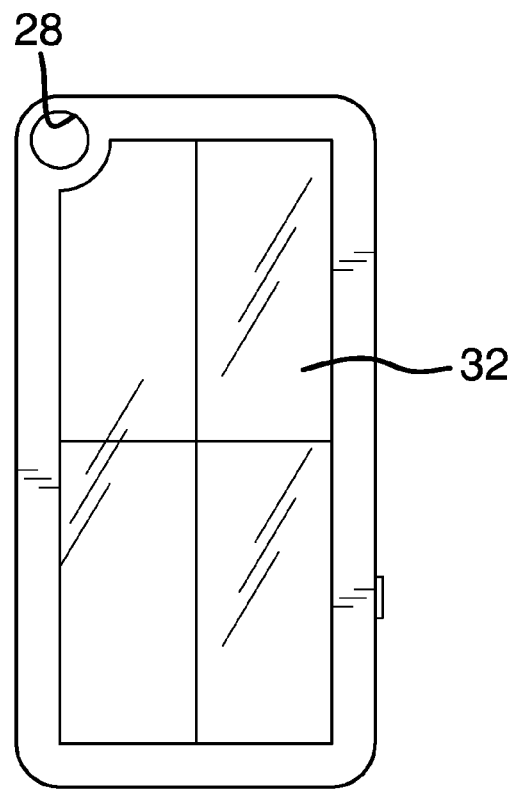
FIG. 5 is a rear view of an embodiment of the disclosure.
Figure 6:
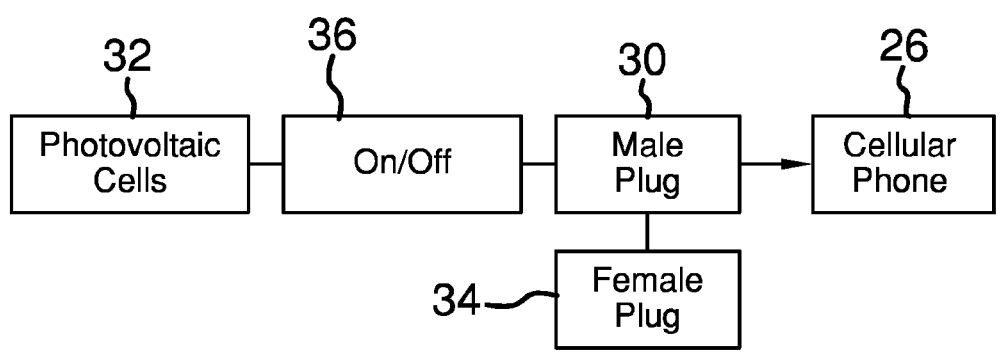
FIG. 6 is a schematic view of an embodiment of the disclosure.

With reference now to the drawings, and in particular to FIGS. 1 through 6 thereof, a new cellular phone charging device embodying the principles and concepts of an embodiment of the disclosure and generally designated by the reference numeral 10 will be described.

As best illustrated in FIGS. 1 through 6, the cellular phone charging case assembly 10 generally comprises a housing 12 having a back wall 14 and a perimeter wall 16 that is coextensive with and attached to a perimeter edge 18 of the back wall 14. The perimeter wall 16 extends away from the back wall 14 and has a distal edge 19 with respect to the back wall 14. A lip 20 is attached to and is coextensive with the distal edge 19. The lip 20 extends inwardly and is positioned over the back wall 14. An area bounded by the lip 20 defines an opening 24 configured to receive a cellular phone 26. The lip 20 releasably retains the cellular phone 26 within the housing 12 between the lip 20 and the back wall 14. The housing 12 may be comprised of a rigid material or semi-flexible material including, but not limited to, metals, plastics, elastomers and the like. The housing 12 will shield the cellular phone from damage should the cellular phone 26 be dropped while employing the housing 12. The perimeter wall 16 of the housing 12 may have one or more openings 28 therein to access buttons on the cellular phone 26 or for allowing other plugs or jacks to be electrically coupled to the cellular phone 26. Additionally, at least one opening 28 may be positioned in the back wall 14 to allow for usage of a camera. Each of these openings 28 will be positioned as determined by the make and model of the cellular phone 26 used with the housing 12.

A male plug 30 is mounted within the housing 12. The male plug 30 is configured to engage the cellular phone 26 when the cellular phone 26 is positioned within the housing 12. Thus, the actual configuration of the male plug 30 will likely depend on the type of cellular phone 26 being utilized and will be particularly adapted for the make and model of the cellular phone 26 it is to be used with.

A plurality of photovoltaic cells 32 is mounted on an outer surface of the back wall 14. The plurality of photovoltaic cells 32 is in electrical communication with the male plug 30 to supply electricity to the male plug 30 when the plurality of photovoltaic cells 32 generate electricity. If a user of the assembly 10 require to charge a battery of their cellular phone 26 without having an electrical outlet or plug available, the user can direct the plurality of photovoltaic cells 32 towards a light source to generate electricity and charge a battery of the cellular phone 26.

A female plug 34 extends through an outer surface of the perimeter wall 16 and is electrically coupled to the male plug 30. This will allow a user of the assembly 10 to electrically couple the male plug 30 to a power source and/or to a data transfer cord. The female plug 34 may be positioned directly opposite of the male plug 30 as shown in the Figures.

An actuator 36 mounted on the housing 12 may be electrically coupled to the plurality of photovoltaic cells 32 and is selectively actuated to allow or disallow an electrical connection between the male plug 30 and the plurality of photovoltaic cells 32. The actuator would typically be utilized when the female plug 34 is being used for charging.

In use, the housing 12 is used in a conventional manner to cover and protect a cellular phone 26. However, the plurality of photovoltaic cells 32 will provide an energy source for the cellular phone 26 when other sources are not available. The female plug 34 allows for usage of typical sources of electrical power such as a wall outlet.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cellular phone charging assembly configured to house a cellular phone, said assembly comprising:
   a housing having a back wall and a perimeter wall being coextensive with and attached to a perimeter edge of said back wall, said perimeter wall extending away from said back wall and having a distal edge with respect to said back wall, a lip being attached to and being coextensive with said distal edge, said lip extending inwardly and being positioned over said back wall, an area bounded by said lip defining an opening configured to receive a cellular phone, said lip releasably retaining the cellular phone within said housing between said lip and said back wall;
   a male plug being mounted within said housing, said male plug being configured to engage the cellular phone when said cellular phone is positioned within said housing;
   a plurality of photovoltaic cells being mounted on an outer surface of said back wall, said plurality of photovoltaic cells being in electrical communication with said male plug to supply electricity to said male plug when said plurality of photovoltaic cells generate electricity; and
   an actuator being electrically coupled to said plurality of photovoltaic cells and being selectively actuated to allow or disallow an electrical connection between said male plug and said plurality of photovoltaic cells.

2. The assembly according to claim 1, further including a female plug extending through an outer surface of said perimeter wall, said female plug being electrically coupled to said male plug.

3. A cellular phone charging assembly configured to house a cellular phone, said assembly comprising:
   a housing having a back wall and a perimeter wall being coextensive with and attached to a perimeter edge of said back wall, said perimeter wall extending away from said back wall and having a distal edge with respect to said back wall, a lip being attached to and being coextensive with said distal edge, said lip extending inwardly and being positioned over said back wall, an area bounded by said lip defining an opening configured to receive a cellular phone, said lip releasably retaining the cellular phone within said housing between said lip and said back wall;
   a male plug being mounted within said housing, said male plug being configured to engage the cellular phone when said cellular phone is positioned within said housing;
   a plurality of photovoltaic cells being mounted on an outer surface of said back wall, said plurality of photovoltaic cells being in electrical communication with said male plug to supply electricity to said male plug when said plurality of photovoltaic cells generate electricity;
   a female plug extending through an outer surface of said perimeter wall, said female plug being electrically coupled to said male plug; and
   an actuator being electrically coupled to said plurality of photovoltaic cells and being selectively actuated to allow or disallow an electrical connection between said male plug and said plurality of photovoltaic cells.

* * * * *